US012592637B2

(12) United States Patent
Huang et al.

(10) Patent No.: US 12,592,637 B2
(45) Date of Patent: Mar. 31, 2026

(54) CHARGE PUMP CIRCUIT AND OPERATING METHOD THEREOF

(71) Applicant: Novatek Microelectronics Corp., Hsinchu (TW)

(72) Inventors: Tsung-Ying Huang, Hsinchu (TW); Yung-Chou Lin, Hsinchu County (TW); Tzu-Hsien Yang, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 28 days.

(21) Appl. No.: 18/735,166

(22) Filed: Jun. 5, 2024

(65) Prior Publication Data

US 2025/0379519 A1 Dec. 11, 2025

(51) Int. Cl.
H02M 3/07 (2006.01)
H02M 1/08 (2006.01)

(52) U.S. Cl.
CPC ............. H02M 3/073 (2013.01); H02M 1/08 (2013.01)

(58) Field of Classification Search
CPC ........ H02M 3/073; H02M 1/08; H02M 3/075; H02M 3/07; H02M 3/04; H02M 3/077; H02M 3/071; H02M 3/078; G11C 5/145; G11C 5/146
See application file for complete search history.

(56) References Cited

U.S. PATENT DOCUMENTS

| | | | |
|---|---|---|---|
| 7,622,984 B2 * | 11/2009 | Lesso | H02M 3/07 363/59 |
| 10,135,444 B2 | 11/2018 | Saeki | |
| 10,541,606 B1 | 1/2020 | Chang et al. | |
| 10,855,177 B2 | 12/2020 | Chang et al. | |
| 2007/0296486 A1 | 12/2007 | Ambroggi et al. | |
| 2017/0126117 A1 | 5/2017 | Saeki | |
| 2020/0021187 A1 | 1/2020 | Chang et al. | |
| 2020/0119638 A1 | 4/2020 | Chang et al. | |

FOREIGN PATENT DOCUMENTS

| | | |
|---|---|---|
| CN | 106961211 | 7/2017 |
| TW | 202007061 | 2/2020 |

OTHER PUBLICATIONS

"Office Action of Taiwan Counterpart Application", issued on Feb. 27, 2025, p. 1-p. 5.

* cited by examiner

*Primary Examiner* — Jung Kim
(74) *Attorney, Agent, or Firm* — JCIPRNET

(57) ABSTRACT

A charge pump circuit including a voltage converter and a pre-charging circuit is provided. The voltage converter is configured to receive a first voltage, and convert the first voltage into a second voltage. The first voltage is larger than the second voltage. The pre-charging circuit is coupled to the voltage converter. The pre-charging circuit is configured to charge a specified node of the voltage converter from a third voltage to a fourth voltage in a first charge period. The voltage converter charges the specified node from the fourth voltage to the first voltage in a second charge period. The fourth voltage is larger than the third voltage, and the third voltage and the fourth voltage are between the first voltage and the second voltage.

20 Claims, 6 Drawing Sheets

110

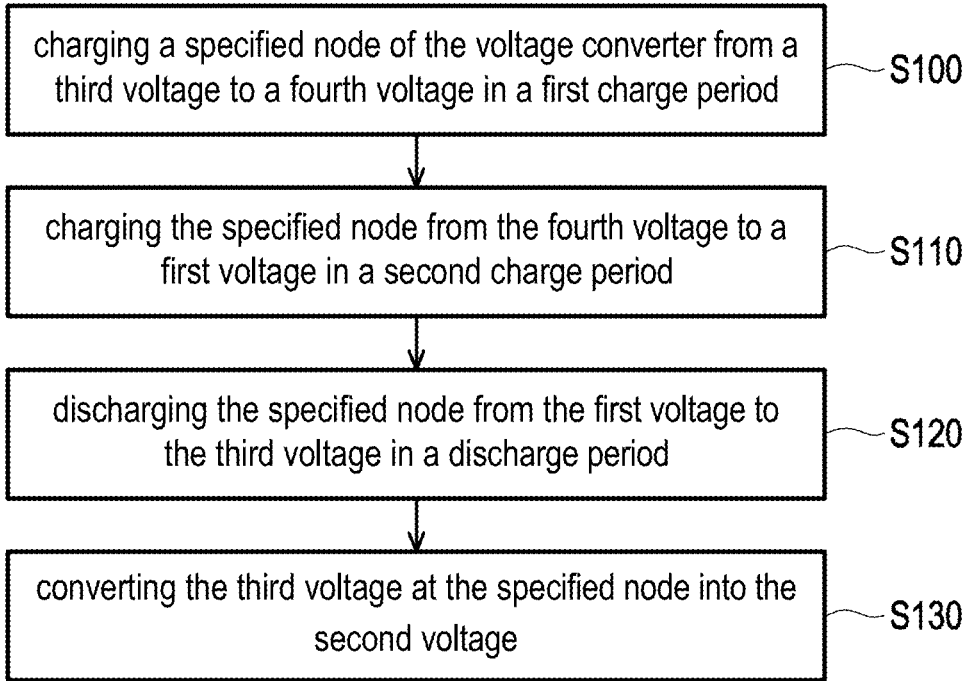

charging a specified node of the voltage converter from a third voltage to a fourth voltage in a first charge period —S100 charging the specified node from the fourth voltage to a first voltage in a second charge period —S110 discharging the specified node from the first voltage to the third voltage in a discharge period —S120 converting the third voltage at the specified node into the second voltage —S130

FIG. 5

CHARGE PUMP CIRCUIT AND OPERATING METHOD THEREOF

BACKGROUND

Technical Field

The invention relates to an electrical circuit and an operating method of the electrical circuit, and in particular, to a charge pump circuit and an operating method of the charge pump circuit.

Description of Related Art

The control structure of charge pump circuits, e.g. negative voltage charge pumps, is mainly divided into two categories. The first category, pulse frequency modulation (PFM), exhibits high light load efficiency, although it is accompanied by the disadvantage of excessive output voltage ripple. The second category, pulse amplitude modulation (PAM), exhibits low voltage output ripple and high light load power consumption due to power loss of power transistors, resulting in low light load efficiency.

SUMMARY

The invention is directed to a charge pump circuit and an operating method of the charge pump circuit, capable of f reducing power loss of power transistors with a pre-charge operation.

An embodiment of the invention provides a charge pump circuit including a voltage converter and a pre-charging circuit. The voltage converter is configured to receive a first voltage, and convert the first voltage into a second voltage. The first voltage is larger than the second voltage. The pre-charging circuit is coupled to the voltage converter. The pre-charging circuit is configured to charge a specified node of the voltage converter from a third voltage to a fourth voltage in a first charge period. The voltage converter charges the specified node from the fourth voltage to the first voltage in a second charge period. The fourth voltage is larger than the third voltage, and the third voltage and the fourth voltage are between the first voltage and the second voltage.

An embodiment of the invention provides an operating method of a charge pump circuit. The charge pump circuit is configured to convert a first voltage into a second voltage. The operating method including: charging a specified node of the voltage converter from a third voltage to a fourth voltage in a first charge period, wherein the fourth voltage is larger than the third voltage, and the third voltage and the fourth voltage are between the first voltage and the second voltage; charging the specified node from the fourth voltage to the first voltage in a second charge period; discharging the specified node from the first voltage to the third voltage in a discharge period; and converting the third voltage at the specified node into the second voltage, wherein the first voltage is larger than the second voltage.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 5 is a flowchart illustrating steps in an operating method of a charge pump circuit according to an embodiment of the invention.

DESCRIPTION OF THE EMBODIMENTS

Figure 1:
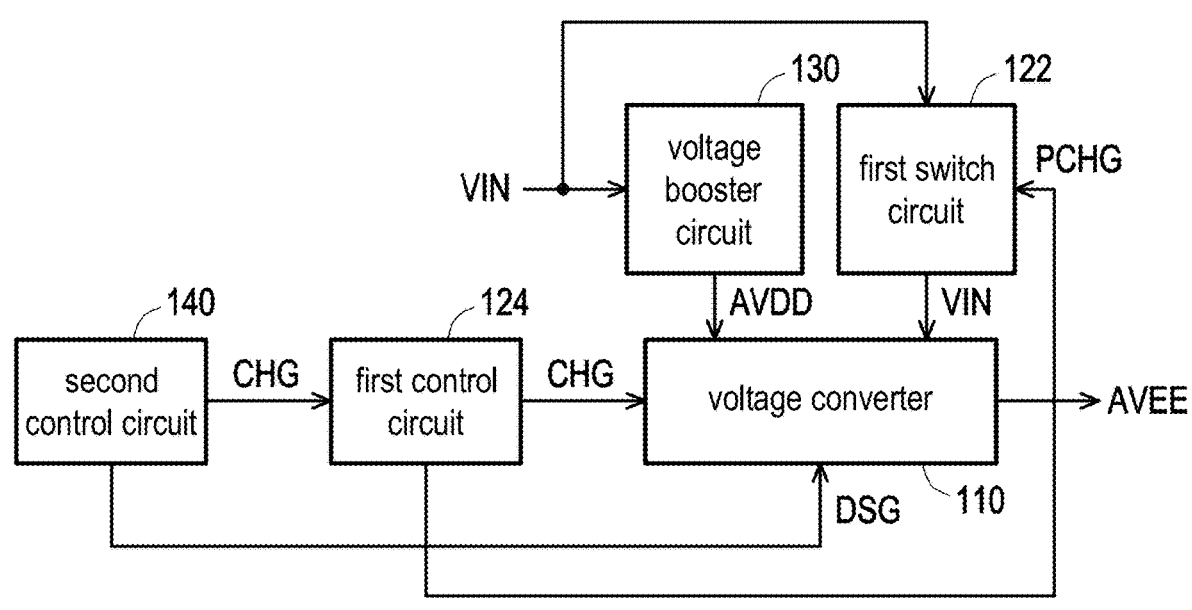
FIG. 1 is a block diagram illustrating a charge pump circuit according to an embodiment of the invention.

The term "coupled (or connected)" used in this specification (including claims) may refer to any direct or indirect connection means. For example, "a first device is coupled (connected) to a second device" should be interpreted as "the first device is directly connected to the second device" or "the first device is indirectly connected to the second device through other devices or connection means". The terms "first" and "second" mentioned in the full text of the specification of the disclosure (including claims) are used to name elements or to distinguish different embodiments or scopes, neither to be used to limit upper or lower limit of the number of elements nor limit the sequence of the elements. In addition, wherever possible, elements/components/steps with the same reference numbers are used in the drawings and embodiments to represent the same or similar parts. Elements/components/steps using the same numbers or using the same terms in different embodiments may serve as cross-reference for each other.

Figure 2:
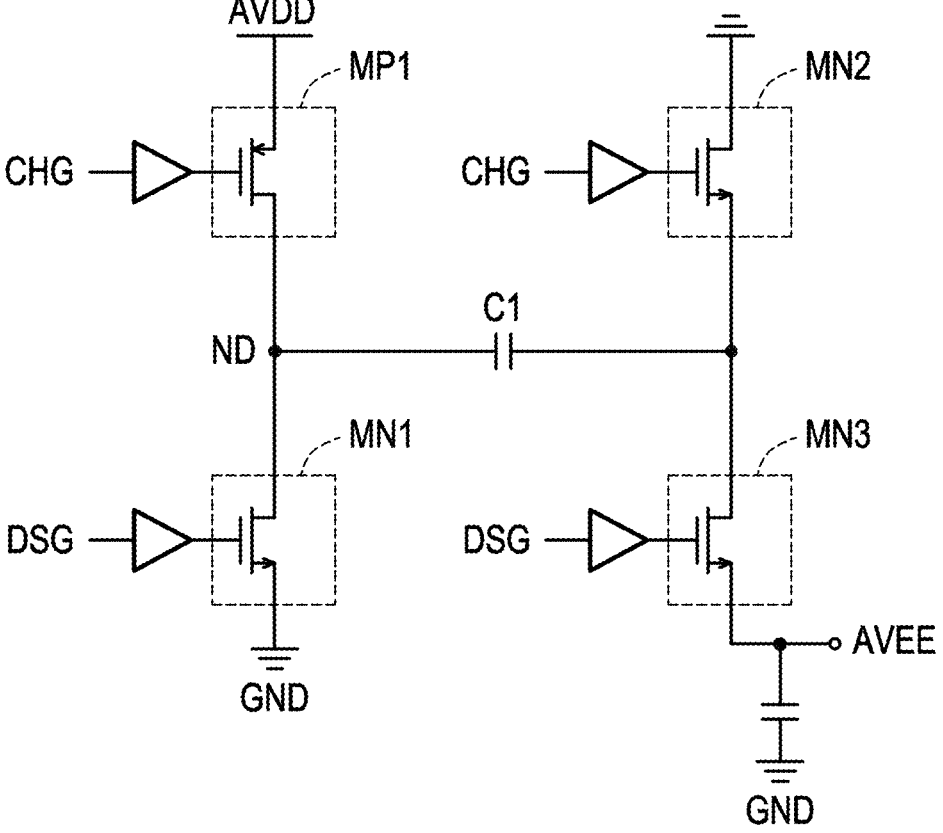
FIG. 2 is a circuit diagram illustrating a voltage converter of FIG. 1 according to an embodiment of the invention.
Figure 3:
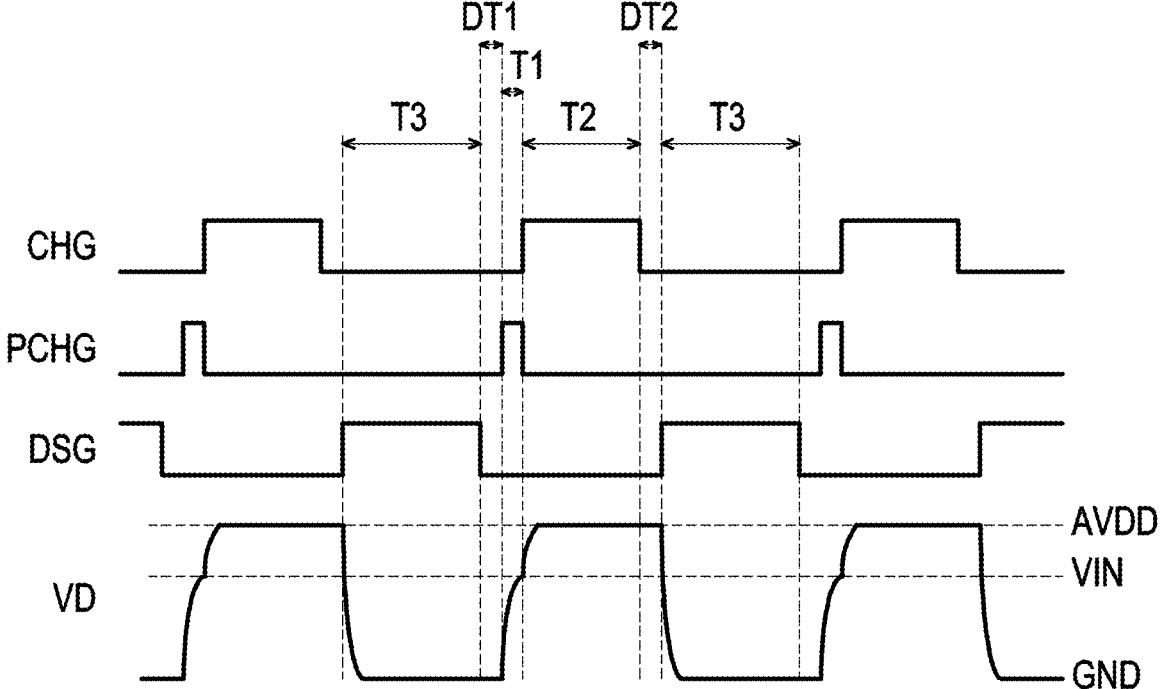
FIG. 3 is a waveform diagram illustrating control signals and a voltage at a drain terminal of FIG. 2 according to an embodiment of the invention.

FIG. 1 is a block diagram illustrating a charge pump circuit according to an embodiment of the invention. FIG. 2 is a circuit diagram illustrating a voltage converter of FIG. 1 according to an embodiment of the invention. FIG. 3 is a waveform diagram illustrating control signals and a voltage at a drain terminal of FIG. 2 according to an embodiment of the invention.

Referring to FIG. 1 to FIG. 3, the charge pump circuit 100 includes a voltage converter 110 and a pre-charging circuit 120. The pre-charging circuit 120 includes a first switch circuit 122 and a first control circuit 124. The charge pump circuit 100 further includes a voltage booster circuit 130 and a second control circuit 140. The charge pump circuit 100 may be implemented in a power integrated circuit (IC), but the invention is not limited thereto.

The voltage converter 110 is configured to receive a first voltage AVDD from the voltage booster circuit 130, and convert the first voltage AVDD into a second voltage AVEE. The voltage booster circuit is configured to receive a pre-charge voltage VIN, boost the pre-charge voltage VIN into the first voltage AVDD, and output the first voltage AVDD to the voltage converter 110.

Referring to FIG. 2, the voltage converter 110 includes a plurality of power transistors MP1, MN1, MN2 and MN3 and a capacitor C1. The power transistor MP1 is a p-type metal-oxide-semiconductor (PMOS) transistor, and the power transistors MN1, MN2 and MN3 are n-type metal-oxide-semiconductor (NMOS) transistors.

Taking the power transistor MP1 for example, the first terminal of the power transistor MP1 (the second switch circuit) is coupled to the first voltage AVDD, the second terminal of the power transistor MP1 is a drain terminal ND and serves as a specified node of the voltage converter 110, and the control terminal of the power transistor MP1 is coupled to a second control signal CHG. In the disclosure, the specified node of the voltage converter 110 is the drain terminal ND of the power transistor MP1. The first control circuit 124 outputs the second control signal CHG to the power transistor MP1 to control the conduction state of the power transistor MP1. When the power transistor MP1 is conducted according to the second control signal CHG, the voltage converter 110 charges the drain terminal ND of the power transistor MP1 to the first voltage AVDD in a second charge period T2. Therefore, the capacitor C1 is charged the first voltage AVDD, and stores the energy in the second charge period T2.

On the other hand, the first terminal of the power transistor MN1 (the third switch circuit) is coupled to the drain terminal ND of the power transistor MP1, the second terminal of the power transistor MN1 is coupled to a third voltage GND, and the control terminal of the power transistor MN1 is coupled to a third control signal DSG. The second control circuit 140 outputs the third control signal DSG to the power transistor MN1 to control the conduction state of the power transistor MN1. When the power transistor MN1 is conducted according to the third control signal DSG, the voltage converter 110 discharges the drain terminal ND of the power transistor MP1 from the first voltage AVDD to the third voltage GND in a discharge period T3. The discharge period T3 is after the second charge period T2. The operation of the power transistors MN2 and MN3 can be deduced in similar manner, and will not be repeated here. Therefore, the energy stored in the capacitor C1 can released in a manner of charge sharing to generate the second voltage AVEE at an output terminal of the voltage converter 110.

By switching the power transistors MP1, MN1, MN2 and MN3, the capacitor C1 is charged with the first voltage AVDD, and discharged with the third voltage GND, so that the voltage converter 110 can provide the second voltage AVEE. The voltage converter 110 may be a negative charge pump converter, and thus, the first voltage AVDD is larger than the second voltage AVEE.

Because PMOS transistors have poorer carrier mobility than NMOS transistors, the power transistor MP1 must be larger to maintain the same conduction resistance. However, large power transistors have large drain parasitic capacitance. At the beginning of each charge period, if the voltage VD at the drain terminal ND of the power transistor MP1 is directly charged from the third voltage GND to the first voltage AVDD, it may result in a large power loss due to the drain parasitic capacitance of the power transistor MP1 during each charge and discharge period, so that the basic operation power consumption of the voltage converter 110 cannot be reduced, affecting the overall conversion efficiency.

At least to overcome said problem, the pre-charging circuit 120 is configured to perform a pre-charge operation on the drain terminal ND of the power transistor MP1 in a first charge period T1, and thus the voltage VD at the drain terminal ND of the power transistor MP1 can be charged to the pre-charge voltage VIN (the fourth voltage) from the third voltage GND in advance. As a result, the power loss of the power transistor MP1 can be reduced with the pre-charge operation.

To be specific, the pre-charging circuit 120 charges the drain terminal ND of the power transistor MP1 from the third voltage GND to the pre-charge voltage VIN in the first charge period T1. Next, the voltage converter 120 charges the drain terminal ND of the power transistor MP1 from the pre-charge voltage VIN to the first voltage AVDD in the second charge period T2. Therefore, the drain terminal ND of the power transistor MP1 is pre-charged from the third voltage GND to the pre-charge voltage VIN in advance, and the voltage VD at the drain terminal ND of the power transistor MP1 is not directly charged from the third voltage GND to the first voltage AVDD. The power loss due to the drain parasitic capacitance of the power transistor MP1 during each charge and discharge period can be reduced with the pre-charge operation.

In the present embodiment, as shown in FIG. 3, the first charge period T1 serves as a charge period and is before the second charge period T2, and the first charge period T1 and the second charge period T2 are a continuous period. In addition, there is a deadtime DT1 between the first charge period T1 and the previous discharge period T3, and there is also a deadtime DT2 between the second charge period T2 and the next discharge period T3.

In the present embodiment, as shown in FIG. 3, the pre-charge voltage VIN is larger than the third voltage GND, and the third voltage GND and the pre-charge voltage VIN are between the first voltage AVDD and the second voltage AVEE. The difference value of the pre-charge voltage VIN and the third voltage GND is larger than the difference value of the first voltage AVDD and the fourth voltage VIN. In an embodiment, the third voltage GND is a ground voltage.

In an embodiment, the first control circuit 124 and the second control circuit 140 may be designed through hardware description languages (HDL) or any other design methods for digital circuits familiar to people skilled in the art and may be hardware circuits implemented through a field programmable gate array (FPGA), a complex programmable logic device (CPLD), or an application-specific integrated circuit (ASIC). In addition, enough teaching, suggestion, and implementation illustration for hardware structures of the first switch circuit 122 and the voltage booster circuit 130 can be obtained with reference to common knowledge in the related art.

Figure 4:
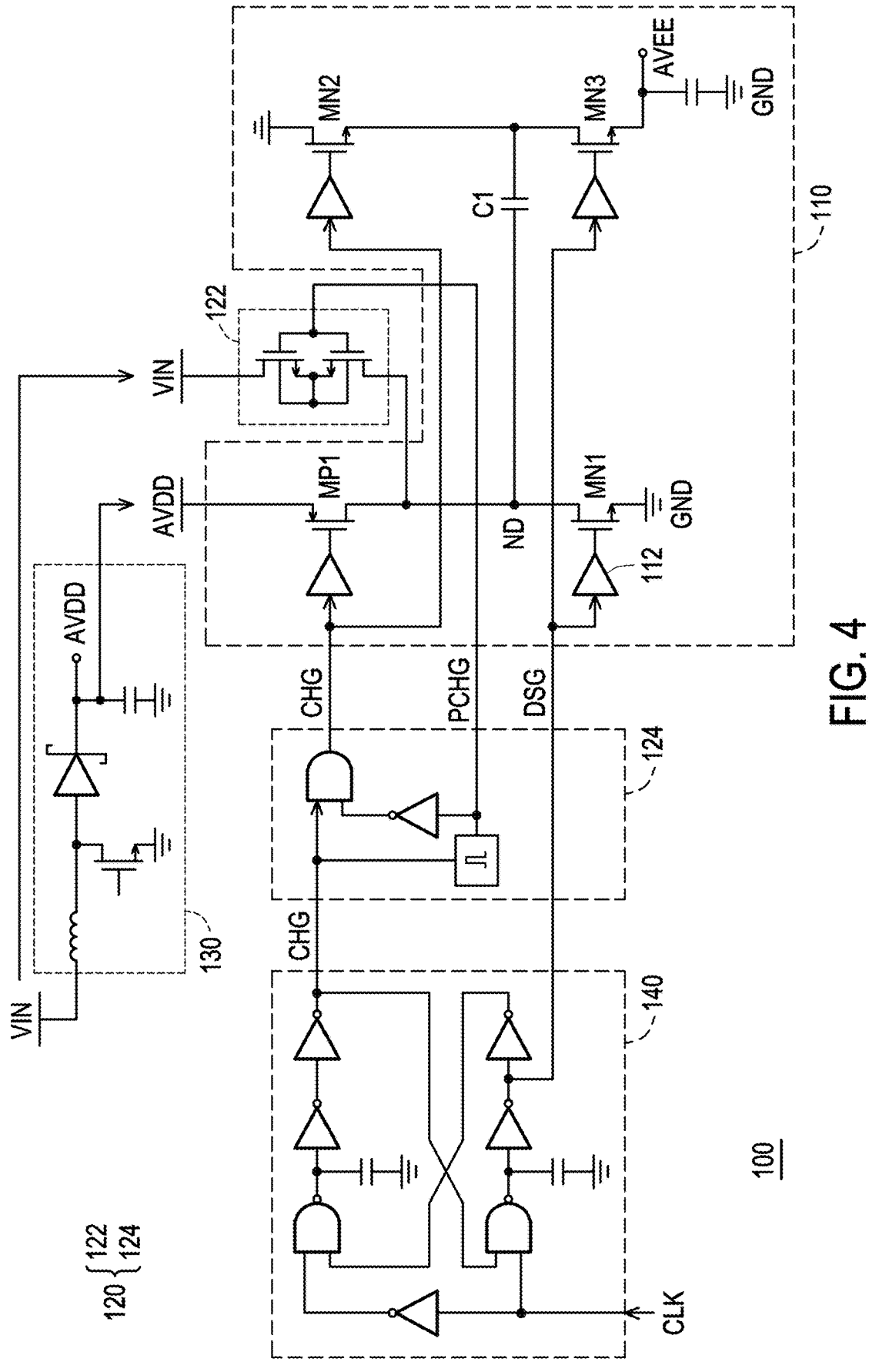
FIG. 4 is a circuit diagram illustrating the charge pump circuit of FIG. 1 according to an embodiment of the invention.

FIG. 4 is a circuit diagram illustrating the charge pump circuit of FIG. 1 according to an embodiment of the invention. Referring to FIG. 3 and FIG. 4, the voltage booster circuit 130 boosts the pre-charge voltage VIN to the first voltage AVDD, and output the first voltage AVDD to the voltage converter 110. The first voltage AVDD serves as a voltage source and is inputted into the voltage converter 110 for voltage conversion.

The first switch circuit 122 has a back-to-back NMOS structure, and is controlled by the first control signal PCHG. The first terminal of the first switch circuit 122 is coupled to the pre-charge voltage VIN, the second terminal of the first switch circuit 122 is coupled to the drain terminal ND of the power transistor MP1, and the control terminal of the first switch circuit 122 is coupled to the first control signal PCHG. When the first switch circuit 122 is conducted according to the first control signal PCHG, the pre-charging circuit 120 can charge the drain terminal ND of the power transistor MP1 in the first charge period T1. The first switch circuit 122 of the back-to-back NMOS structure can avoid a reverse current flowing from the drain terminal ND of the power transistor MP1 to the first terminal of the first switch circuit 122 in the first charge period T1. The structure of the first switch circuit 122 does not intend to limit the invention.

On the other hand, the second control circuit 140 is configured to receive a clock signal CLK, and generate the second control signal CHG and the third control signal DSG. The second control circuit 140 outputs the second control signal CHG to the first control circuit 124. The first control circuit 124 receives the second control signal CHG, and generates the first control signal PCHG according to the second control signal CHG. The first control circuit 124 outputs the first control signal PCHG to the first switch circuit 122 to control the conduction state of the first switch circuit 122. The second control circuit 140 outputs the third control signal DSG to the power transistors MN1 and MN3 to control the conduction state of the power transistors MN1 and MN3.

The first control circuit 124 and the second control circuit 140 may be integrated into a single control circuit and serve as a non-overlap circuit, but the invention is not limited thereto. The first control signal PCHG, the second control signal CHG, and the third control signal DSG are configured to control the pre-charge/charge and the discharge operations so that they do not overlap.

Next, the voltage converter 110 may operate in a mode of pulse amplitude modulation (PAM). The charge period T2 and the discharge period T3 are continuously staggered, and the power transistors MP1 and MN1 are frequently switched. After the end of the discharge period T3, the pre-charging period T1 is added to charge the drain terminal ND of the power transistor MP1 to the pre-charge voltage VIN, and then the charge period T2 is started by conducting the power transistors MP and MN2, so as to charge the voltage cross the capacitor to the first voltage AVDD to complete the charge period T2. As shown in FIG. 3, the introduction of pre-charging can reduce the overall power consumption of the first voltage AVDD by converting the power loss of the power transistor to the pre-charging voltage VIN.

In addition, the voltage converter 110 further includes a plurality of amplifiers 112 coupled to corresponding power transistors. The amplifiers may serve as buffers or inverters to process the corresponding control signals.

FIG. 5 is a flowchart illustrating steps in an operating method of a charge pump circuit according to an embodiment of the invention. Referring to FIG. 1 to FIG. 3 and FIG. 5, the operating method of the present embodiment is at least adapted to the charge pump circuit 100 depicted in FIG. 1, but the disclosure is not limited thereto.

Taking the charge pump circuit 100 for example, in step S100, the pre-charging circuit 120 charges a specified node ND of the voltage converter 110 from the third voltage GND to the fourth voltage VIN in the first charge period T1. In step S110, the voltage converter 110 charges the specified node ND of the voltage converter 110 from the fourth voltage VIN to the first voltage AVDD in the second charge period T2. In step S120, the voltage converter 110 discharges the specified node ND of the voltage converter 110 from the first voltage AVDD to the third voltage GND in the discharge period T3. In step S130, the voltage converter 110 converts the third voltage GND at the specified node ND of the voltage converter 110 into the second voltage AVEE. For example, the energy stored in the capacitor C1 can released in the manner of charge sharing to generate the second voltage AVEE at the output terminal of the voltage converter 110.

The operating method of the charge pump circuit described in the embodiment of the invention is sufficiently taught, suggested, and embodied in the embodiments illustrated in FIG. 1 to FIG. 4, and therefore no further description is provided herein.

Figure 6:
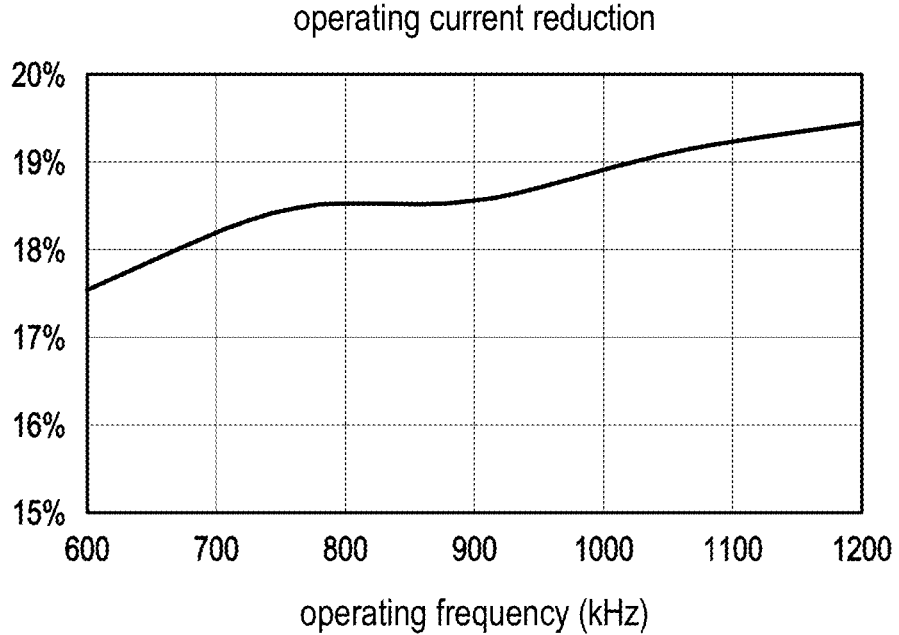
FIG. 6 is a curve diagram showing an operating current reduction at different operating frequencies according to an embodiment of the invention.

FIG. 6 is a curve diagram showing an operating current reduction at different operating frequencies according to an embodiment of the invention. Referring to FIG. 6, the charge pump circuit 100 can operate at least at frequencies between 600 to 1200 kilohertz (kHz), and a specified constant pre-charge voltage is applied. Compared to a charge pump circuit without the pre-charge operation, the operating current reduction of the disclosure is between 17% and 20%. The operating current reduction indicates that the power loss can be reduced with the pre-charge operation.

Figure 7:
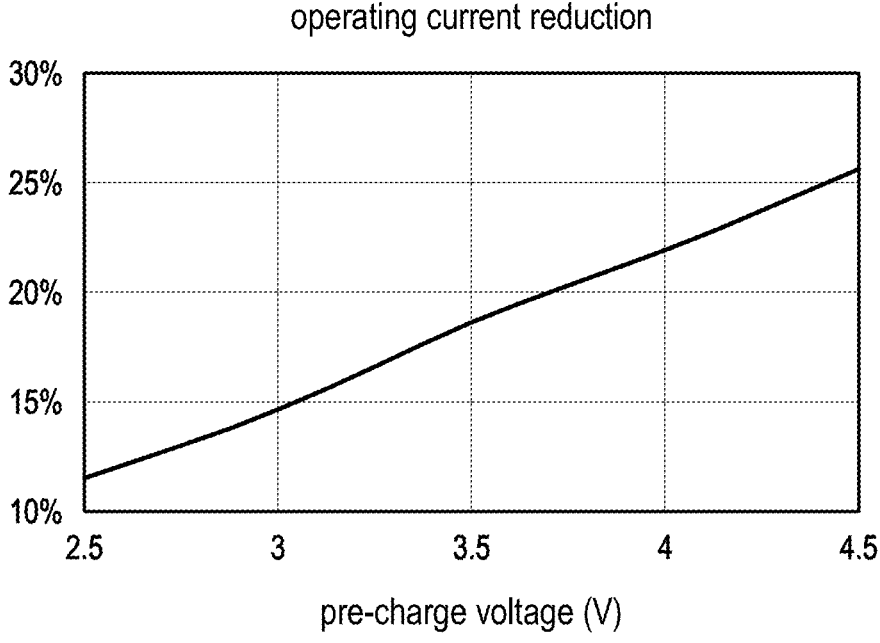
FIG. 7 is a curve diagram showing an operating current reduction at different pre-charge voltages according to an embodiment of the invention.

FIG. 7 is a curve diagram showing an operating current reduction at different pre-charge voltages according to an embodiment of the invention. Referring to FIG. 7, the charge pump circuit 100 can operate at a specified frequency, and a pre-charge voltage between 2.5 to 4.5 volts is selected and applied to the charge pump circuit 100. Compared to a charge pump circuit without the pre-charge operation, the operating current reduction of the disclosure is between 10% and 30%. The operating current reduction indicates that the power loss can be reduced with the pre-charge operation.

From FIG. 6 and FIG. 7, the basic operation power consumption of the voltage converter 110 can be reduced by 10~30% with different operation frequencies and pre-charging voltages to achieve energy saving effect.

In summary, in the embodiments of the invention, the pre-charging circuit charges the drain terminal of the power transistor to the pre-charge voltage in advance before the drain terminal of the power transistor is charged to the first voltage. The voltage at the drain terminal of the power transistor is not directly charged from the third voltage to the first voltage. As a result, the power loss due to the drain parasitic capacitance of the power transistor during each charge and discharge period can be reduced with the pre-charge operation.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A charge pump circuit, comprising:
   a voltage converter, configured to receive a first voltage, and convert the first voltage into a second voltage, wherein the first voltage is larger than the second voltage; and
   a pre-charging circuit, coupled to the voltage converter, and configured to charge a specified node of the voltage converter from a third voltage to a fourth voltage in a first charge period, wherein the voltage converter charges the specified node from the fourth voltage to the first voltage in a second charge period,
   wherein the fourth voltage is larger than the third voltage, and the third voltage and the fourth voltage are between the first voltage and the second voltage.

2. The charge pump circuit according to claim 1, wherein the first charge period is before the second charge period.

3. The charge pump circuit according to claim 1, wherein the first charge period and the second charge period are a continuous period.

4. The charge pump circuit according to claim 1, wherein the voltage converter discharges the specified node from the first voltage to the third voltage in a discharge period.

5. The charge pump circuit according to claim 4, wherein the discharge period is after the second charge period.

6. The charge pump circuit according to claim 1, wherein a difference value of the fourth voltage and the third voltage is larger than a difference value of the first voltage and the fourth voltage.

7. The charge pump circuit according to claim 1, further comprising:
   a voltage booster circuit, coupled to the voltage converter, and configured to receive the fourth voltage, boost the fourth voltage into the first voltage, and output the first voltage to the voltage converter.

8. The charge pump circuit according to claim 1, wherein the pre-charging circuit comprises:
   a first switch circuit, comprising a first terminal, a second terminal and a control terminal, wherein the first terminal of the first switch circuit is coupled to the fourth voltage, the second terminal of the first switch circuit is coupled to the specified node, and the control terminal of the first switch circuit is coupled to a first control signal,
   wherein when the first switch circuit is conducted according to the first control signal, the pre-charging circuit charges the specified node in the first charge period.

9. The charge pump circuit according to claim 8, wherein the pre-charging circuit further comprises:
   a first control circuit, coupled to the first switch circuit, and configured to output the first control signal to the first switch circuit.

10. The charge pump circuit according to claim 9, further comprises:
   a second control circuit, coupled to the first control circuit, and configured to receive a clock signal, and generate and output a second control signal to the first control circuit according to the clock signal,
   wherein the first control circuit receives the second control signal, and generates the first control signal according to the second control signal.

11. The charge pump circuit according to claim 10, wherein the voltage converter comprises:
   a second switch circuit, comprising a first terminal, a second terminal and a control terminal, wherein the first terminal of the second switch circuit is coupled to the first voltage, the second terminal of the second switch circuit serves as the specified node, and the control terminal of the second switch circuit is coupled to a third control signal,
   wherein the first control circuit further outputs the third control signal to the second switch circuit, and when the second switch circuit is conducted according to the third control signal, the voltage converter charges the specified node in the second charge period.

12. The charge pump circuit according to claim 10, wherein the voltage converter comprises:
   a third switch circuit, comprising a first terminal, a second terminal and a control terminal, wherein the first terminal of the third switch circuit is coupled to the specified node, the second terminal of the third switch circuit is coupled to the third voltage, and the control terminal of the third switch circuit is coupled to a third control signal,
   wherein the second control circuit further generates and outputs the third control signal to the third switch circuit according to the clock signal, and when the third switch circuit is conducted according to the third control signal, the voltage converter discharges the specified node in a discharge period.

13. An operating method of a charge pump circuit, wherein the charge pump circuit is configured to convert a first voltage into a second voltage, the operating method comprising:
   charging a specified node of the voltage converter from a third voltage to a fourth voltage in a first charge period, wherein the fourth voltage is larger than the third voltage, and the third voltage and the fourth voltage are between the first voltage and the second voltage;
   charging the specified node from the fourth voltage to the first voltage in a second charge period;
   discharging the specified node from the first voltage to the third voltage in a discharge period; and
   converting the third voltage at the specified node into the second voltage, wherein the first voltage is larger than the second voltage.

14. The operating method of the charge pump circuit according to claim 13, wherein the first charge period is before the second charge period.

15. The operating method of the charge pump circuit according to claim 13, wherein the first charge period and the second charge period are a continuous period.

16. The operating method of the charge pump circuit according to claim 13, wherein the discharge period is after the second charge period.

17. The operating method of the charge pump circuit according to claim 13, wherein a difference value of the fourth voltage and the third voltage is larger than a difference value of the first voltage and the fourth voltage.

18. The operating method of the charge pump circuit according to claim 13, further comprising:
   receiving the fourth voltage for voltage charging in the first charge period; and
   boosting the fourth voltage into the first voltage for voltage charging in the second charge period.

19. The operating method of the charge pump circuit according to claim 13, wherein the specified node is charged according to a first control signal in the first charge period, the specified node is charged according to a second control signal in the second charge period, and the operating method further comprises:
   generating the first control signal according to the second control signal; and
   generating the second control signal according to a clock signal.

20. The operating method of the charge pump circuit according to claim 19, wherein the specified node is discharged according to a third control signal in the discharge period, and the operating method further comprises:
   generating the third control signal according to the clock signal.

* * * * *